(12) United States Patent
Griesbach

(10) Patent No.: US 7,722,760 B2
(45) Date of Patent: May 25, 2010

(54) ASSEMBLY FOR REMOVING MINERAL CONTAMINANTS

(75) Inventor: Thomas G. Griesbach, Hortonville, WI (US)

(73) Assignee: Griesbach Corporation, Greenville, WI (US)

( * ) Notice: Subject to any disclaimer, the term of this patent is extended or adjusted under 35 U.S.C. 154(b) by 705 days.

(21) Appl. No.: 11/562,538

(22) Filed: Nov. 22, 2006

(65) Prior Publication Data
US 2008/0116143 A1   May 22, 2008

(51) Int. Cl.
*C02F 1/74* (2006.01)
(52) U.S. Cl. .................. 210/108; 210/134; 210/143; 210/205; 210/277; 210/290
(58) Field of Classification Search .............. 210/108
See application file for complete search history.

(56) References Cited

U.S. PATENT DOCUMENTS

| 4,322,299 A | 3/1982 | Scholten et al. |
| 4,430,228 A * | 2/1984 | Paterson ................ 210/665 |
| 4,839,057 A | 6/1989 | White |
| 5,096,580 A | 3/1992 | Auchincloss |
| 5,096,596 A | 3/1992 | Hellenbrand et al. |
| 5,147,530 A | 9/1992 | Chandler et al. |
| 5,895,565 A * | 4/1999 | Steininger et al. ........... 210/85 |
| 7,204,930 B2 * | 4/2007 | Nightingale .............. 210/741 |
| 7,300,569 B2 * | 11/2007 | Petty ....................... 210/138 |

OTHER PUBLICATIONS

*AER-MAX systems for sulfur and iron problems.* http://air-pump.com/package.html (available prior to Nov. 22, 2005).

* cited by examiner

*Primary Examiner*—Peter A Hruskoci
(74) *Attorney, Agent, or Firm*—Merchant & Gould P.C.

(57) ABSTRACT

Filtration of water to provide cleansed water, using an assembly that monitors the volume of water cleansed and backflushes the filtration media based on that volume. The assembly includes a control valve that monitors the amount of water that has been processed, controls the addition of water and oxygen to the assembly, and thus affects the overall operation of the assembly.

20 Claims, 1 Drawing Sheet

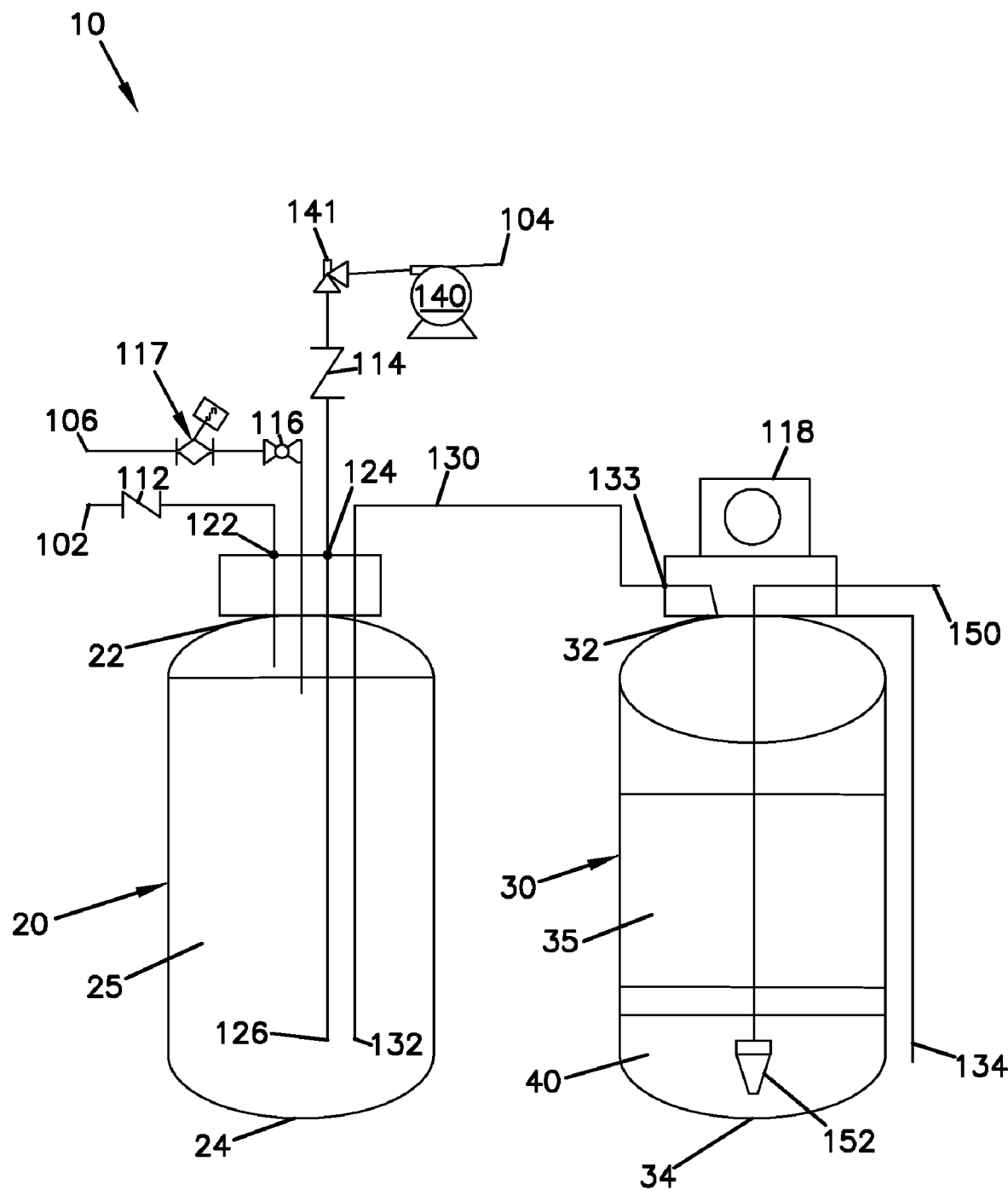

ASSEMBLY FOR REMOVING MINERAL CONTAMINANTS

BACKGROUND OF THE INVENTION

The present invention relates to an apparatus and process for filtering water in general, and to an apparatus and process for removing contaminants such as iron, manganese and sulfur, from water, such as well water.

Many households and commercial facilities use well water as their source of water, either drinking water, cooling water, make-up water, or for other residential or industrial uses. Well water commonly contains naturally occurring mineral contaminants, such as iron, sulfur, copper, and manganese. These contaminants affect the odors and taste of the water, and may also stain plumbing fixtures and corrode pipes.

Mineral contaminants are commonly removed from water by entraining air (which includes oxygen) in the raw water and passing the aerated water through a bed of particulate such as calcium carbonate or dolomite to raise the pH level of the water and facilitate precipitation of the undesirable minerals. The dissolved oxygen in the water, in particular, enhances the oxidation of soluble iron II to insoluble iron III. Air is often added to the raw water, usually during a back wash cycle, by passing the water through a pipe section of decreasing cross-sectional area with an air inlet known as a venturi nozzle. The increased pH water may then be passed through one or more filter media to remove the precipitated contaminants.

What is desired is an improved water filtration system, one which supplies the oxygen for the necessary aeration of the raw water to produce satisfactory oxidation of the unwanted minerals without reducing available water pressure and which is not susceptible to clogging or degradation due to water flow.

U.S. Pat. No. 5,096,596 to Hellenbrand et al. provides one design. This patent describes an apparatus for removing mineral contaminants from water which has an aeration tank connected to a supply of water, an inlet for admitting the water to the aeration tank and an outlet for discharging water. A diffuser is connected to the aeration tank inlet and has a plurality of apertures which permit the diffusion of the contaminated water into an airhead within the aeration tank. A controller controls a source of compressed air to permit oxygen to be supplied independently of the water supply to the interior of the aeration tank for recharging the aeration tank with oxygen. A bed of calcium carbonate chips may be positioned inside the aeration tank beneath the spray of contaminated water. A pick-up tube has an open end located above the bed of calcium carbonate chips and is connected to the outlet of the aeration tank. A filter tank has an inlet connected to the pick-up tube of the aeration tank and an outlet adapted to be connected to a water supply line. The system has a distributor tube connected to the outlet of the filter tank with an opening within the multimedia filter bed, so that the oxygenated water may be drawn through the multimedia filter bed so that a significant portion of the contaminants may be removed from the water and the filtered water may be supplied to the outlet of the filter tank. The system has a multimedia filter bed positioned within the filter tank which has a plurality of filtration layers.

There is always room for alternate designs.

SUMMARY

The present invention is directed to a filtration assembly and process for removing mineral contaminants from water and other liquids by adding oxygen to the liquid. The assembly provides liquid, usually water, and also provides oxygen, usually in the form of air, to the liquid based upon the quantity of liquid that has been previously treated, e.g., passed through the filtration portion of the apparatus. The assembly also back-flushes the system, based up the quantity of liquid that has been treated. A master control assembly is provided to initiate the various processes.

One aspect of this disclosure includes an assembly for removing mineral contaminants from water. The assembly includes an oxidation tank having an inlet for providing water to an interior of the tank and an outlet for discharging water from the interior and a filtration tank having an inlet for receiving water from the oxidation tank to an interior of the tank and an outlet for discharging water from the interior. Calcium carbonate and magnesium, either singly, together, or as a mixture, may be used to the adjust the pH of the incoming water as needed. An oxygen source is operably connected to the interior of the oxidation tank, and a transfer line provides fluid connection from the outlet of the oxidation tank to the inlet of the filtration tank. A control assembly is included to monitor the volume of water transferred from the oxidation tank to the filtration tank, and to provide oxygen to the oxidation tank based on that volume of water. In some embodiments, the control assembly is further configured to initiate a back-flushing procedure of the filtration tank based on that volume of water. Additionally or alternatively, the control assembly is further configured to activate a water source for providing water to the interior of the oxidation tank.

In another particular aspect of this disclosure, an assembly for removing mineral contaminants from water is disclosed, the assembly having a means for, any or all of, monitoring the volume of water transferred from the oxidation tank to the filtration tank, providing oxygen to the oxidation tank based on that volume of water, initiating a back-flushing procedure of the filtration tank based on that volume of water, and activating a water source for providing water to the interior of the oxidation tank.

Methods of removing mineral contaminants from water are also provided, the methods including combining oxygen and water in an oxygenation tank to form oxygenated water, passing the oxygenated water through filtration media to remove any particulate contaminants, monitoring the oxygenated water to determine a volume of water passed through the filtration media; and back-flushing the filtration media when a predetermined volume of water has passed through the filtration media. A control valve assembly can be used to monitor the oxygenated water to determine the volume of water passed through the filtration media. Additionally or alternately, a control valve assembly can be used to activate back-flushing of the filtration media when a predetermined volume of water has passed through the filtration media.

These and other embodiments are disclosed in the figure specification below.

BRIEF DESCRIPTION OF THE DRAWING

The FIGURE is a schematic diagram of an apparatus of the present disclosure, having an oxidation tank, a filtration tank, and a series of piping and valves providing fluid communication for oxygen and liquid between the tanks.

DETAILED DESCRIPTION OF THE PREFERRED EMBODIMENT

The invention of this disclosure is directed to filtration of water to provide cleansed water, using an assembly that monitors the volume of water cleansed and back-flushes the filtration media based on that volume. The assembly includes a control valve that monitors the amount of water that has been processed, controls the addition of water and oxygen to the assembly, and thus affects the overall operation of the assembly.

Referring now to the FIGURE, an assembly of the present disclosure is schematically illustrated as assembly 10. Although assembly 10 is configured to accept and filter any liquid, in most embodiments the liquid will be water. Throughout this disclosure, although water is the liquid referenced, it should be understood that other liquids could be filtered or cleansed with the apparatus of this disclosure. Assembly 10 includes a first tank 20, which can be referred to as an oxidation tank, where oxygen is combined with the water to be filtered. Assembly 10 also includes a second tank 30, which can be referred to as a media tank or filtration tank, where the water is filtered. Leading to tank 20, connecting tank 20 to tank 30, and out from tank 30 is a collection of piping with valves.

Oxidation tank 20 has a first end 22 and an opposite second end 24; in the illustrated orientation, first end 22 is the top end and second end 24 is the bottom end. Tank 20 includes an interior 25 for containing water, oxygen, pH adjustment media as needed, and other elements. As described below, in tank 20, water present in interior 25 is exposed to oxygen and thus oxygenated.

Filtration tank 30 also has a first end 32 and an opposite second end 34; in the illustrated orientation, first end 32 is the top end and second end 34 is the bottom end. Tank 30 includes an interior 35 for containing filtration media 40 and water. As described below, in tank 30, oxygenated water received from tank 20 is filtered.

Raw water, such as from a well, river, lake or other water source, usually containing unwanted mineral contaminants, is delivered to assembly 10, often under pressure, via water supply line 102. The raw water enters tank 20 via inlet 122 and flows into interior 25. In some embodiments, the water may pass through or by a diffuser, splash plate, or other distribution element to produce a spray effect or other desired effect. Positioned within supply line 102 and upstream of tank inlet 122 may be a check valve 112 to inhibit the flow of liquid out from tank 20 through line 102.

Oxygen, such as from atmospheric air, is delivered to assembly 10 via oxygen inlet line 104. In some embodiments, the oxygen may be obtained from a compressed oxygen or compressed air source. In other embodiments, a compressor or pump 140 may be present to increase the pressure of incoming atmospheric air or other oxygen source. The oxygen enters tank 20 via inlet 124 and flows into interior 25 through an outlet 126 in line 104. Positioned within inlet line 104 upstream of tank inlet 124 may be a check valve 114 to inhibit the flow of oxygen out from tank 20.

Preferably, oxygen outlet 126 is positioned no more than 50% of the total distance between bottom end 24 and top end 22 away from bottom end 24. That is, oxygen outlet 126 is positioned closer to bottom end 24 than to top end 22. In some embodiments, oxygen outlet 126 is positioned no more than 25% of the total distance between bottom end 24 and top end 22 away from bottom end 24; that is, outlet 126 is in the lower 25% of tank 20. As the oxygen from outlet 126 rises through the water within tank 20, the water absorbs oxygen and begins the oxidation of, e.g., any iron, manganese and hydrogen sulfide that might be present.

Connecting tank 20 to tank 30 is a transfer line 130, which has a first end 132 in tank interior 25 and a second end 133 operably connected to tank interior 35. In assembly 10, transfer line 130 provides fluid flow from tank interior 25 to tank 30, thus, first end 132 of line 130 can be referred to as an inlet end and second end 133 can be referred to as an outlet end. Inlet end 132 is positioned no more than 50% of the total distance between bottom end 24 and top end 22 away from bottom end 24 of tank 20. That is, inlet end 132 of transfer line 130 is positioned closer to bottom end 24 than to top end 22. In some embodiments, inlet end 132 of transfer line 130 is positioned no more than 25% of the total distance between bottom end 24 and top end 22 away from bottom end 24. In some embodiments, inlet end 132 is about 6 inches or less away from bottom end 24. The fluid flowing through transfer line 130 is oxygenated water, which may have some entrained oxygen bubbles therein.

In some embodiments, assembly 10 includes an overflow or purge line 106 providing fluid communication between tank interior 25 and the atmosphere. This line 106 may also be referred to as a vent line. Overflow line 106 includes appropriate valving, e.g., valve 116 and valve 117, to control the flow through line 106. One or both valves 116, 117, or additional valves, may be present.

Returning to tank 30, positioned at top end 32 of tank 30 is a control valve assembly 118, which, as described in detail below, monitors and controls the amount of water that has entered tank 30 via transfer line 130. Valve assembly 118 monitors and preferably controls water flow throughout assembly 10 and initiates back-flushing of media 40, as needed.

As described above, oxygenated water enters tank 30 from tank 20 via transfer line 130. Present within interior 35 of tank 30 is filtration media 40, which removes oxidized iron and other particulate contaminants from the water flowing therethrough. Examples of suitable media 40 include, but are not limited to sand, carbon or charcoal, birm (manganese dioxide-coated pumicite), garnet, alumina, and combinations thereof, either layers or combined. Typically, filtration media 40 is in particulate form. Media 40 is selected based on the contaminants to be removed, such as iron, hydrogen sulfide, manganese, copper, chlorine, heavy metals, etc.

A water outlet line 150 removes cleansed water from tank 30 after having passed through at least a portion of filtration media 40. In some embodiments, outlet line 150 includes a strainer 152 to inhibit removing media 40 with the water. Outline line 150 is connected to and provides water to the residence, industry, or other locale.

A drain line 134 may be present to provide fluid communication between interior 35 and the exterior of tank 30. Depending on the configuration of assembly 10, drain line 134 may be used as a water inlet for back-flushing media 40, or additionally or alternately, may be an overflow line.

As mentioned generally above, assembly 10 includes control valve assembly 118 that monitors the amount of water that has been processed by assembly 10; control valve assembly 118, in essence, affects the overall operation of the assembly. Control valve assembly 118 monitors and optionally controls the amount of water, by volume, that has entered tank 30 via transfer line 130. Control valve assembly 118 includes a liquid volume monitor or meter, such as a turbine type flow meter. At least one microprocessor is operably wired to control valve assembly 118 to activate various valves and other equipment, as needed. In some embodiments, control valve assembly 118 may include a timing device.

Based on the volume of water passed into tank 30, control valve assembly 118 activates addition of oxygen to tank 20 via oxygen line 104. In many embodiments, control valve assembly 118 activates pump 140 and opens valve 114, thus providing oxygen to interior 25 of tank 20, which oxygenates the water within tank 20. Control valve assembly 118 can be programmed for variable volumes of water and variable oxygenation frequency and duration.

This aeration or oxygenation of the water (by the addition of air or other oxygen source to the water in tank 20) facilitates the oxidation of iron so that filtration media 40 in tank 30 can better filter the iron out of the water. Oxygen typically also facilitates the oxidation of other materials, such as manganese and hydrogen sulfide.

Exemplary Configuration

One exemplary configuration of assembly 10 is now described; it is understood that other configurations are within the scope of this disclosure. This exemplary assembly 10 is set up as illustrated in the FIGURE, with tanks 20, 30 and transfer line 130 therebetween, water supply line 102 having valve 112, oxygen inlet line 104 having pump 140 and valve 114 and including a pressure relieve valve 141, purge line 106 with valves 116, 117, control valve assembly 118, drain line 134 and outlet line 150.

In this embodiment, valve 112 in water supply line 102 is an inlet check valve to prevent backflow of water into line 102 from tank 20. This check valve is the same size as the supply line, for example, a 1 inch check valve.

Oxidation tank 20 is a conventional tank, e.g., a 12×52 inch glass wound tank with a standard 2½ inch opening at top end 22; it is understood that other sizes can be used. The water enters tank 20 from supply line 102 via inlet 122 and flows through a distributor head. Depending on the level of the water in interior 25, the water may free fall through any void space above the water level in interior 25. Vent line 106 is positioned to end approximately 1 foot below the distributor head of water supply line 102.

Within vent line 106 is valve 117, in this embodiment a 110 volt ¼ NPT solenoid valve that opens and closes per request of control valve 118. Valve 117 enables the void space air in oxidation tank 20 to be purged. Vent line 106 also includes valve 116, which in this embodiment, is a ¼ NPT ball valve that allows solenoid valve 117 to be isolated for maintenance activities without removing the system from service. Any discharge through vent line 106 is generally a mix of air and water. Vent line 106 can be plumbed to combine with drain line 134 from tank 30.

Connecting tank 20 to tank 30 is transfer line 130 for the oxygenated water, which in this embodiment is a 1 inch copper pipe extending from end 132 at tank 20 to end 133 at tank 30. Transfer line 130 is positioned so that end 132 is approximately 3 inches from bottom end 24 of tank 20.

Incoming air via line 104 passes through pump 140, valve 114, and a pressure relief valve 141. In this exemplary embodiment, pump 140, which provides a source of air to sparge the water in the oxidation tank, has a maximum flow rate of 0.32 cfm and a maximum pressure of 40 psi. Valve 114, in this embodiment, which can be referred to as a check valve, is a ¼ inch NPT check valve that inhibits bleed of fluid from oxidation tank 20 back into pump 140. A pressure relief valve 141 is positioned downstream of pump 140 in air line 104 to inhibit and preferably prevent the entire system from over pressurizing. In this embodiment, pressure relief valve 141 is a ¼ inch NPT relief valve.

Control valve 118 controls the operation of various elements of assembly 10, such as actuation of pump 140, solenoid valve 117 and backwashing operation of media tank 30, based on the volumetric flow of water into tank 30.

In this embodiment, media tank 30 is a 12×52 inch glass wound tank. It is understood that other sizes can be used, the size being selected to contain the desired amount of filtration media. Tank 30 contains filtration media 40, which in this embodiment, is a layered bed of 45 pounds of birm (top layer), 8 pounds of "KDF 85" (middle layer), and 15 pounds of #20 garnet (bottom layer). The water enters tank 30 at top end 32 and progresses through media 40 toward bottom end 34, where outlet distributor 152 embedded in the garnet media transfers the treated water out of media tank 30.

Drain line 134, for overflow and/or backwashing operations, in this embodiment, is a ½ inch CPVC drain line, although other materials, as allowed by local plumbing codes, could be used.

From tank 30, outlet line 150, in this embodiment, is a 1 inch copper pipe, although other materials, as allowed by local plumbing codes, could be used. Line 150 distributes the filtered water to a location of use.

Operation of Assembly and Removal of Contaminants

In use, assembly 10 removes iron and other mineral contaminants from raw water, which enters assembly 10 through water supply line 102 and valve 112 and enters oxidation tank 20. Naturally occurring turbulence in tank 20 mixes the oxygen throughout the water in tank 20. The water is oxygenized via air line 104, to initiate the oxidation of dissolved iron II to insoluble iron III.

Valve assembly 118 regulates the amount of oxygen added to the water by controlling how long air pump 140 and valve 114 (e.g., a solenoid valve) are energized, thus adding oxygen to tank 20. Control valve assembly 118 energizes pump 140 and valve 114 for a predetermined time based upon a predetermined volume of water having passed through assembly 10, particularly through transfer line 130.

Oxygenated water transfers from oxidation tank 20 through transfer line 130 to tank 30. Assembly 10 is usually configured so that the oxygenated water remains within tank 20 for at least about two minutes (at the rated system flow of assembly 10), before the water is picked up by transfer line 130 and fed to tank 30, where it passes through media 40 and is cleansed. While passing through control valve assembly 118, the volume of water is monitored and totalized, thus providing a calculation of the amount of water having been processed. After intimate mixing with and passing through media 40, the water leaves media tank 30 through control valve assembly 118 and outlet line 150 to a downstream water distribution system.

After an extended period of operation, a build-up of particulates is present in media 40, which may decrease the efficiency of assembly 10. Control valve assembly 118 also controls the operation of backwashing of media 40, based on the volume of water processed. When a predetermined volume of water has been processed, control valve assembly 118 initiates the backwashing operation.

Assembly 10 may be configured so that during the backwashing process, water is still obtained and media tank 30 is bypassed.

For the backwashing or backflushing operation, water or other rinse solution is added to media tank 30 in reverse flow; that is, water or other rinse solution is added to media tank in a flow path opposite to the path of water when being filtered. The backwash water is added to tank 30 via water outlet line 150, so that it enters proximate bottom 34 of tank 30, e.g., at strainer 152. The backwash water flow rate is controlled by control valve assembly 118, e.g., by a flow control insert. The waste water from the backwash exits tank 30 via drain line 134.

When the backwash step is complete, control valve assembly 118 may be programmed to allow media 40 to settle during a period of no water flow in tank 30, in a settling or quiet step.

Control valve assembly may additionally or alternately be programmed so that after any settling step, control valve assembly 118 initiates a rinse step, passing fresh water through media 40, in the direction of normal flow, to prepare media 40 for use.

When any settling and rinse steps are complete, control valve assembly 118 resets the bypass to allow oxygenated water from tank 20 to pass through media 40.

The above specification, examples and data provide a complete description of the configuration and use of the assembly of the invention. It is understood that alternate embodiments and configurations can be used. For example, although an example of a three-layered filtration bed has been provided, it is understood that more or less layers may be utilized. Additionally, although an example of three different filtration medias has been provided, it is understood that more or less medias may be utilized. Since many embodiments of the invention can be made without departing from the spirit and scope of the invention, the invention resides in the claims hereinafter appended.

What is claimed is:

1. An assembly for removing mineral contaminants from water, the assembly comprising:
   an oxidation tank having an inlet for providing water to an interior of the tank and an outlet for discharging water from the interior;
   an oxygen source operably connected to the interior of the oxidation tank;
   a filtration tank having an inlet for receiving water from the oxidation tank to an interior of the tank and an outlet for discharging water from the interior;
   a transfer line providing fluid connection from the outlet of the oxidation tank to the inlet of the filtration tank; and
   a control assembly configured to:
      monitor the volume of water transferred from the oxidation tank to the filtration tank; and
      provide oxygen to the oxidation tank based on that volume of water.

2. The assembly of claim 1, wherein the control assembly is further configured to initiate a back-flushing procedure of the filtration tank based on that volume of water.

3. The assembly of claim 2, wherein the control assembly is further configured to activate a water source for providing water to the interior of the oxidation tank.

4. The assembly of claim 1, wherein:
   the oxidation tank has a top end and a bottom end, with the inlet at the top end; and
   the filtration tank has a top end and a bottom end, with the inlet for receiving water at the top end and the outlet for discharging water at the top end.

5. The assembly of claim 1, wherein the oxygen source comprises atmospheric air provided by a supply line and a pump in the supply line.

6. The assembly of claim 5, wherein the control assembly is configured to activate the pump in the supply line.

7. The assembly of claim 1, wherein the interior of the filtration tank contains filtration media therein.

8. The assembly of claim 7, wherein the filtration media comprises at least one of sand, carbon, charcoal, birm, garnet, and alumina.

9. The assembly of claim 8, wherein the filtration media comprises at least two layers of different materials.

10. An assembly for removing mineral contaminants from water, the assembly comprising:
    an oxidation tank having an inlet for providing water to an interior of the tank and an outlet for discharging water from the interior;
    an oxygen source operably connected to the interior of the oxidation tank;
    a filtration tank having an inlet for receiving water from the oxidation tank to an interior of the filtration tank and an outlet for discharging water from the interior;
    a transfer line providing fluid connection from the outlet of the oxidation tank to the inlet of the filtration tank; and
    means for:
       monitoring the volume of water transferred from the oxidation tank to the filtration tank;
       providing oxygen to the oxidation tank based on that volume of water; and
       initiating a back-flushing procedure of the filtration tank based on that volume of water.

11. The assembly of claim 10, wherein the means further activates a water source for providing water to the interior of the oxidation tank.

12. The assembly of claim 10, wherein:
    the oxidation tank has a top end and a bottom end, with the inlet at the top end; and
    the filtration tank has a top end and a bottom end, with the inlet for receiving water at the top end and the outlet for discharging water at the top end.

13. The assembly of claim 10, wherein the oxygen source comprises atmospheric air provided by a supply line and a pump in the supply line.

14. The assembly of claim 13, wherein the control assembly is configured to activate the pump in the supply line.

15. The assembly of claim 10, wherein the interior of the filtration tank contains filtration media therein.

16. The assembly of claim 15, wherein the filtration media comprises at least one of sand, carbon, charcoal, birm, garnet, and alumina.

17. The assembly of claim 16, wherein the filtration media comprises at least two layers of different materials.

18. An assembly for removing mineral contaminants from water, the assembly comprising:
    an oxidation tank having a top end, a bottom end, an inlet at the top end for providing water to an interior of the tank and an outlet for discharging water from the interior;
    an oxygen inlet line adapted to deliver oxygen to the oxidation tank, the oxygen inlet line including an oxygen outlet disposed in the interior of the oxidation tank, the oxygen outlet being positioned closer to the bottom end of the oxidation tank than the top end;
    a filtration tank having an inlet for receiving water from the oxidation tank to an interior of the tank and an outlet for discharging water from the interior;
    a transfer line providing fluid connection from the outlet of the oxidation tank to the inlet of the filtration tank; and
    a control assembly adapted to:
       monitor the volume of water transferred from the oxidation tank to the filtration tank; and
       provide oxygen to the oxidation tank based on that volume of water.

19. The assembly of claim 18, wherein the oxygen outlet is positioned in the interior of the oxidation tank no more than 50% of the total distance between the bottom end and the top end away from the bottom end of the oxidation tank.

20. The assembly of claim 18, wherein the oxygen outlet is in the lower 25% of the tank.

* * * * *